US006964011B1

(12) United States Patent
Mizuno (10) Patent No.: US 6,964,011 B1
(45) Date of Patent: Nov. 8, 2005

(54) DOCUMENT TYPE DEFINITION GENERATING METHOD AND APPARATUS, AND STORAGE MEDIUM FOR STORING PROGRAM

(75) Inventor: Takafumi Mizuno, Murayama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/449,706

(22) Filed: Nov. 24, 1999

(30) Foreign Application Priority Data

Nov. 26, 1998 (JP) ................................. 10-336278

(51) Int. Cl.[7] ............................................. G06F 17/22
(52) U.S. Cl. ...................... 715/513; 715/524; 704/4; 704/10; 717/143
(58) Field of Search ........................ 715/513, 900, 715/512, 524; 704/4, 10; 717/143

(56) References Cited

U.S. PATENT DOCUMENTS

| 5,583,762 | A | * | 12/1996 | Shafer ........................ 715/532 |
| 5,842,159 | A | * | 11/1998 | Nakamura et al. ............. 704/4 |
| 5,956,726 | A | * | 9/1999 | Aoyama et al. ............ 707/102 |
| 6,014,680 | A | * | 1/2000 | Sato et al. ................... 715/513 |
| 6,105,022 | A | * | 8/2000 | Takahashi et al. ............. 707/3 |
| 6,161,084 | A | * | 12/2000 | Messerly et al. ............... 704/9 |
| 6,208,956 | B1 | * | 3/2001 | Motoyama ..................... 704/2 |
| 6,330,574 | B1 | * | 12/2001 | Murashita ................... 715/513 |

FOREIGN PATENT DOCUMENTS

GB         2 307 571 A      5/1997    ........... G06F 17/27

OTHER PUBLICATIONS

Casillas, Arantza, 'DTD-Driven Bilingual Document Generation, 1998, pp. 32-38.*

Frank, Ulrich, "Enhancing Object-Oriented Modeling With Concepts to Integrate Electronic Documents"; System Sciences, 1997, Proceedings of the 13th Hawaii Int'l. Conference, Wailea, HI, USA, Jan. 7-10, 1997; pp., 127-136.

Kay, M.H., "DTDGen—XML DTD Generator" Internet Citation, XP002225792, from Internet: <url:htt://xml.coverpages.org/dtdgenDoc980505.html>.

Klein B. et al., "Error Tolerant Document Structure Analysis"; 1997 IEEE Int'l. Forum on Research & Technology Advances, Washington, DC, USA, May 1997, pp. 116-127.

(Continued)

Primary Examiner—Stephen Hong
(74) Attorney, Agent, or Firm—Fitzpatrick, Cella, Harper & Scinto (57) ABSTRACT

There is disclosed a document type definition generating method comprising, in a structured document provided with a tag having an element name in each document element, judging a physical structure of each document element from indention, blank lines, and positional relation between tags, analyzing words and phrases in each document element, and judging a semantic structure of the document element based on words and phrases connection and word types. When the physical and semantic structures of document elements having tags different in element name are similar, the elements are regarded as being of the same type and one element name is excluded from a list for generating the document type definition. When the physical and semantic structures of document elements having tags with the same element name are different, the elements are regarded as being of the different types and one element name is changed. Furthermore, the words and phrases between a start tag and an end tag with the same title are analyzed, and the information to be included between the tags is obtained to generate the document type definition. Thereby, tag meaning is correctly treated, and the document type definition with tag redundancy removed therefrom is generated.

17 Claims, 6 Drawing Sheets

OTHER PUBLICATIONS

Warmer, J. et al., "Processing SGML Documents"; Electronic Publishing, Wiley, Chichester, GB, vol. 4, No. 1, Mar. 1, 1991, pp. 3-26.

Raggett D., "Clean Up Your Web Pages With HP's HTML Tidy"; Computer Networks & ISDN Systems, North Holland Pub. Amsterdam, NL., vol. 30, No. 1-7, Apr. 1, 1998 pp. 730-732.

* cited by examiner

```
<Title>TV SET OPERATING INSTRUCTIONS</Title>
<Date>19998.2.1</Date>
<Author>TARO YAMADA</Author>
<Body>
    <Section>1. PLUG IN</Section>
    <Section>2. TURN ON POWER</Section>
    <Section>3. TUNE IN</Section>
    <Sect>4. CONTROL VOLUME</Sect>
</Body>
```

FIG. 3B

```
<Para>
    ___________________
    ___________________
    ___________________
</Para>

<Para>
    ___________________
    ___________________
</Para>
```

```
<!DOCTYPE manual [
<!ELEMENT manual (Title, Date, Author, Body)>
<!ELEMENT Title (#PCDATA)>
<!ELEMENT Date (#PCDATA)>
<!ELEMENT Author (#PCDATA)>
<!ELEMENT Body (Section+)>
<!ELEMENT Section (#PCDATA)>
]>
```

DOCUMENT TYPE DEFINITION GENERATING METHOD AND APPARATUS, AND STORAGE MEDIUM FOR STORING PROGRAM

BACKGROUND OF THE INVENTION

1. Field of the Invention

The present invention relates to a computerized document processing executed by a personal computer, a word processor, and the like, particularly to a method and apparatus for generating the document type definition of a structured document, and a storage medium in which a program is stored.

2. Related Background Art

In recent years, the computerized documents prepared by a personal computer, a word processor, and the like have widely been used. The introduction of a structured document is advanced in which the computerized document is consistently treated and the elements constituting the document are provided with semantic information. In this structured document, each document element is held between front and back tags including element names (tag names), and in many cases description is performed for each document type in accordance with the document type definition of defining a place, order, frequency and the like in which the element appears.

On the other hand, the structured document can be described without preparing the document type definition. However, when the documents prepared by a plurality of users are integrated to form one document, and if the individual users use the tags having arbitrary titles, there is a possibility of attaching different tag names to the same element, or conversely attaching the same tag name to different elements.

In this case, there arise problems that the semantic information attached to the tag cannot correctly be handled, and that redundancy is generated with respect to the tag.

SUMMARY OF THE INVENTION

An objective of the present invention is to provide a method and apparatus for generating document type definition from a structured document provided with tags, and a storage medium which stores the program.

Another objective of the present invention is to provide a document type definition generating method and apparatus which can correctly treat semantic information given to tags, and a storage medium which stores the program.

Further objective of the present invention is to provide a document type definition generating method and apparatus which can generate document type definition with redundancy to tags removed therefrom, and a storage medium which stores the program.

According to one aspect, the present invention which achieves these objectives relates to a document processing method comprising: in a structured document provided with a tag having an element name in each document element, a physical structure judging step of judging a physical structure of each document element; a semantic structure judging step of judging a semantic structure of the document element; and a document type definition generating step of generating document type definition to define appearance state of the document element in the structured document based on judgment results of the physical structure judging step and the semantic structure judging step.

According to another aspect, the present invention which achieves these objectives relates to a document processing apparatus comprising: in a structured document provided with a tag having an element name in each document element, physical structure judging means for judging a physical structure of each document element; semantic structure judging means for judging a semantic structure of the document element; and document type definition generating means for generating document type definition to define appearance state of the document element in the structured document based on judgment results of the physical structure judging means and the semantic structure judging means.

According to still another aspect, the present invention which achieves these objectives relates to a computer-readable storage medium storing a document type definition generating program for controlling a computer to perform document type definition generation, the program comprising codes for causing the computer to perform, in a structured document provided with a tag having an element name in each document element, a physical structure judging step of judging a physical structure of each document element, a semantic structure judging step of judging a semantic structure of the document element, and a document type definition generating step of generating document type definition to define appearance state of the document element in the structured document based on judgment results of the physical structure judging step and the semantic structure judging step.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

A preferred embodiment of the present invention will be described hereinafter with reference to the accompanying drawings.

First Embodiment

Figure 1:
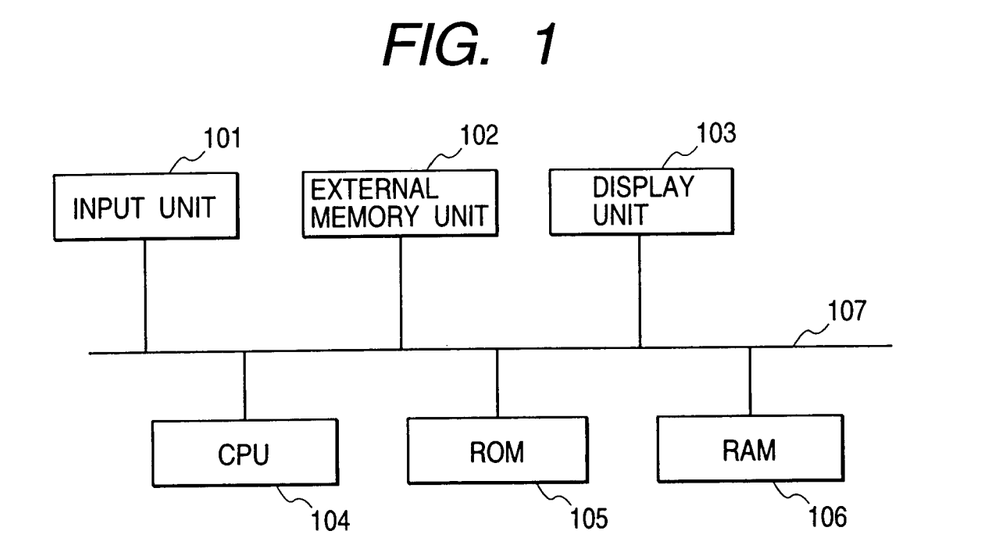
FIG. 1 is a block diagram of a document type definition generating apparatus.

FIG. 1 is a block diagram of a document type definition generating apparatus according to the present invention.

In FIG. 1, an input unit 101 is constituted of a keyboard, a pointing apparatus, and the like, and is used for a user to input data or commands. An external memory unit 102 is constituted of a storage apparatus using media such as a hard disk to store structured document data as a processing object, data of semantic information database (DB) described later, generated document type definition, and the like. A display unit 103 is constituted of CRT, a liquid crystal display, and the like to display the structured document data, the generated document type definition, and the like.

A CPU 104 performs control of each component of the apparatus, reads and executes a program, and realizes various processings. A ROM 105 stores fixed data and program. A control program for realizing a processing procedure as described later with reference to the flowcharts of FIGS. 2 to 6 may be stored in the ROM 105, or read from the external memory unit 102. A RAM 106 presents an operation area necessary for the processing of the apparatus. A bus 107 connects the apparatus components.

Figure 2:
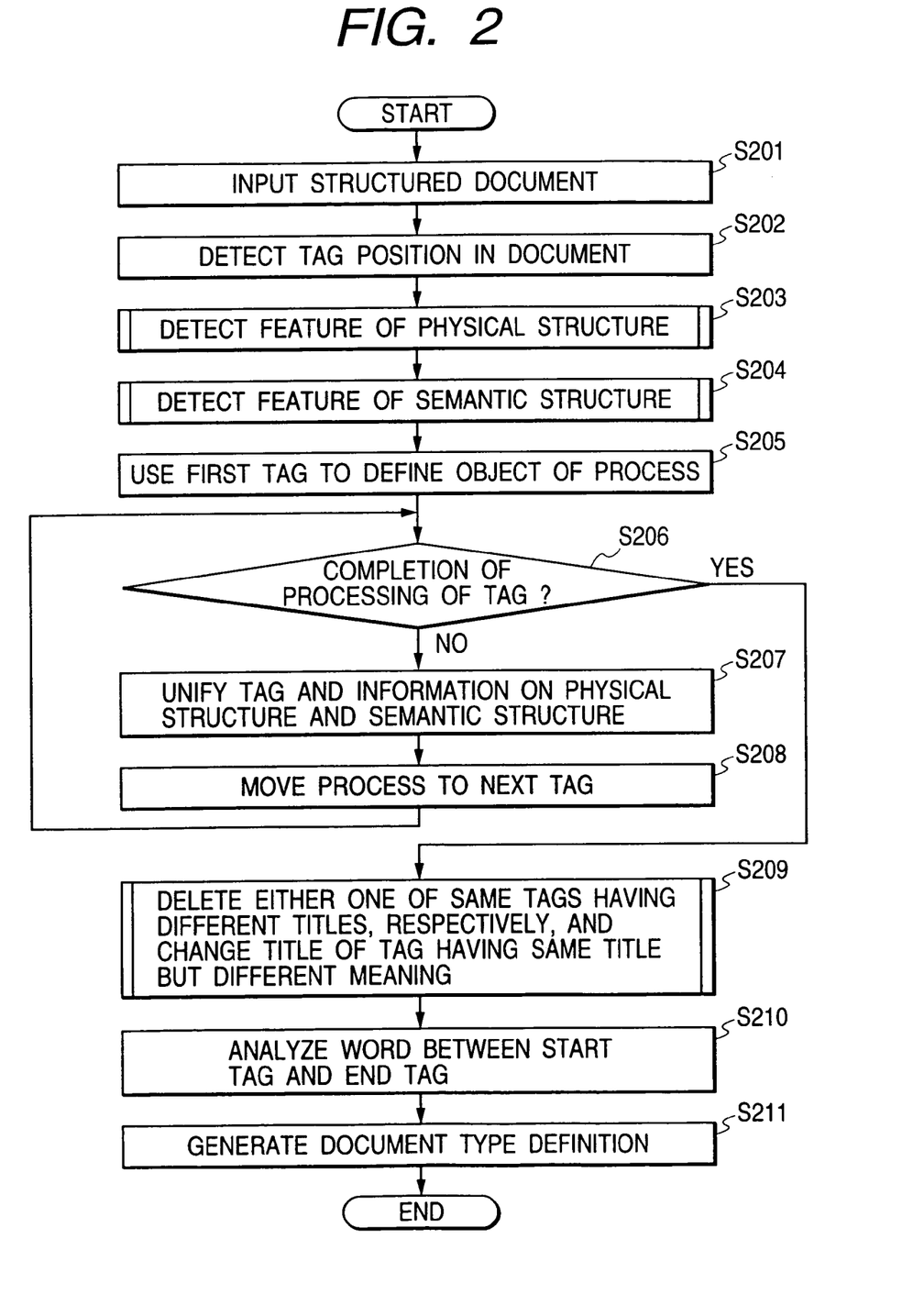
FIG. 2 is a flowchart showing the procedure of a document type definition generation processing.

FIG. 2 is a flowchart showing the procedure of a document type definition generation processing according to the present invention.

Figure 3A:
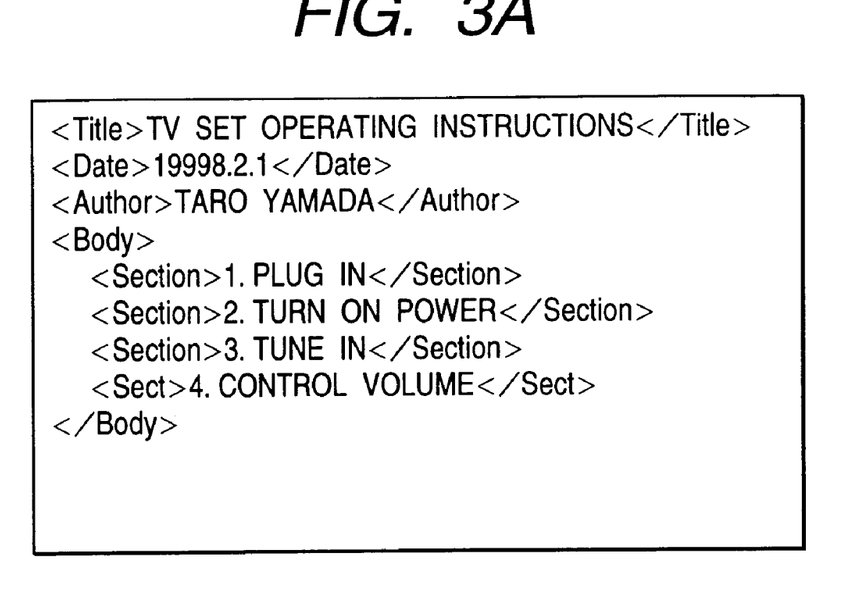
FIGS. 3A and 3B are diagrams showing examples of structured document data.
Figure 3B:
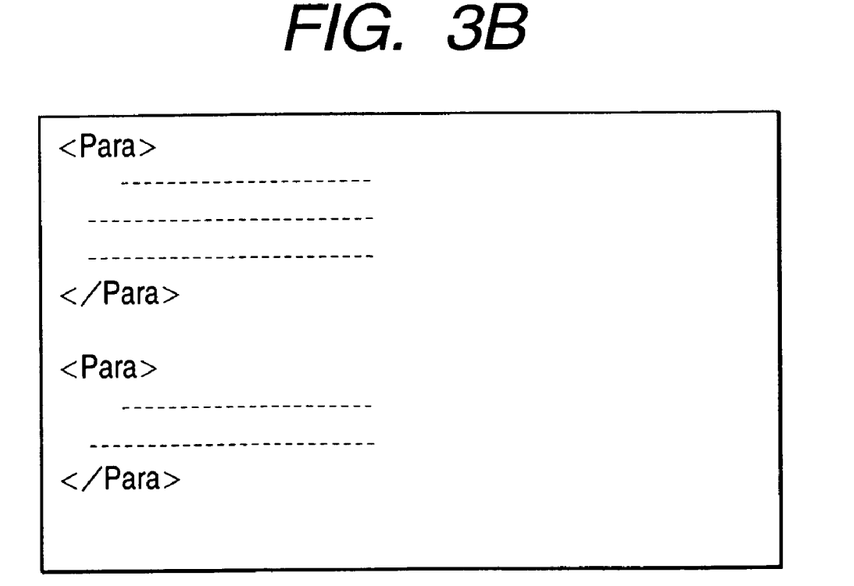

First, the structured document is inputted in step S201. This is executed by reading the structured document from the external memory unit 102. One example of the structured document given herein is shown in FIG. 3A. For example, a first line "<Title>" indicates a start tag, "</Title>" indicates an end tag, and "TV SET OPERATING INSTRUCTIONS" held between these tags is a document element indicating a tag content. Moreover, "Title" is an element name (tag name). Furthermore, the attribute and value of the element can be described in the tag.

In the next step S202, each tag position is detected from the structured document, and a tag number is attached in order from the top "<Title>".

Figure 4:
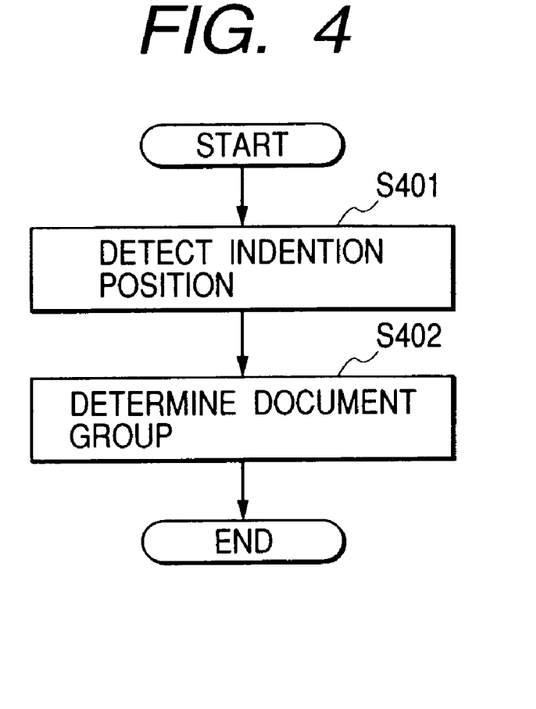
FIG. 4 is a flowchart showing the processing procedure of physical structure analysis.

Subsequently, in step S203, the physical structure in the document is detected. For example, in FIG. 3B, as diagrammatically represented in "<Para>" indicating a paragraph, a feature that a sentence group starting with an indention is regarded as the paragraph is detected. The processing procedure for detecting such physical structure is shown in the flowchart of FIG. 4.

First, in step S401, a line in which indention is performed is found in the document, and in the next step S402 the sentence group following the line is detected. In this case, the line in which the indention is performed to the line in which the next indention is performed, or to the line right before a blank line can be set to the sentence group. In this case, the indention (double indention) performed in quotation in which the quotation is represented by performing the indention, and blank lines described by constantly skipping one or more lines are excluded as structures meaningless for the detection of the physical structure from the entire document pattern to perform the processing in the step S402.

Figure 5:
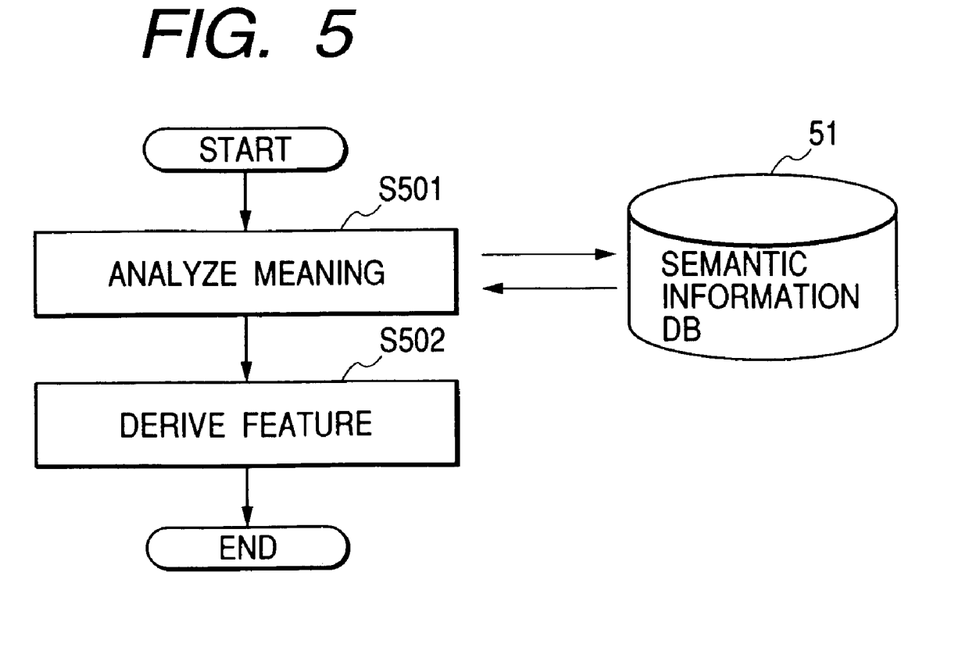
FIG. 5 is a flowchart showing the processing procedure of semantic structure analysis.

Turning back to FIG. 2, in the next step S204, the semantic structure of the inputted structured document is detected. As one example, in FIG. 3A, the contents of tags "<Section>" have forms in which "1.", "2.", "3." are attached to top positions. Here, the content of tag "<Section>" can semantically be presumed to have "numeral." on its top. One example of processing procedure for detecting the semantic structure is shown in the flowchart of FIG. 5.

First, in step S501, communication is performed with a semantic information database (DB) 51 with respect to all words and codes in the document to provide the connection between words in the document and the types of words and codes. In the next step S502, the semantic structure found in each document element is detected based on this result.

Returning to FIG. 2, in the next step S205, a first appearing tag is regarded as the tag to be processed, and it is judged in step S206 whether or not the processing of the tag is all completed.

When the tag processing is not completed, the process shifts to step S207, in which the tag as the present processing object, and the information on the physical and semantic structures detected in the steps S203 and 204 are unified. Here, the unifying means that when physical and semantic features are present in the line related with the tag used as the present processing object, the tag and the information are connected. Subsequently, in step S208, the process is moved to the next appearing tag, thereby returning to the step S206.

Figure 6:
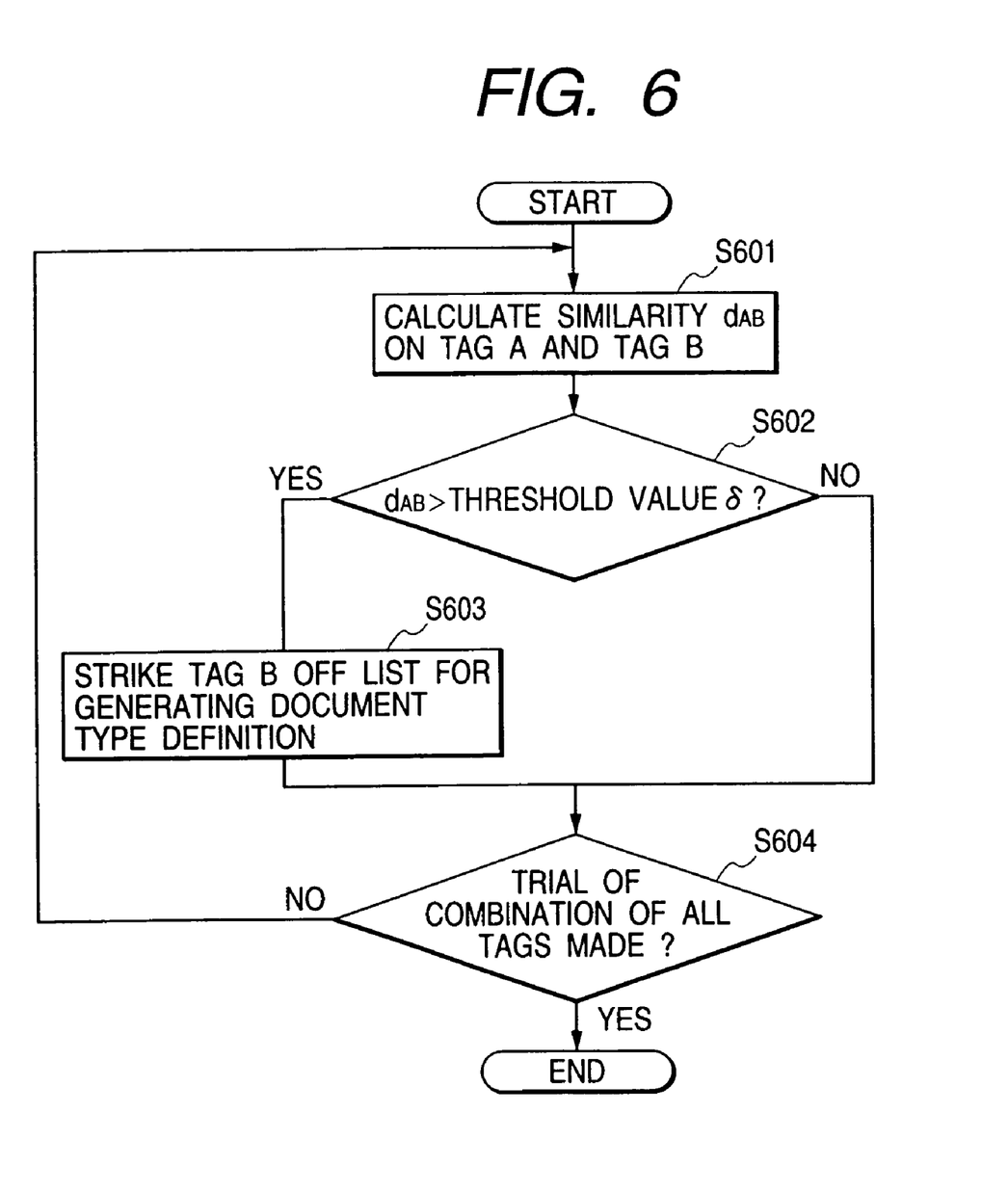
FIG. 6 is a flowchart showing the processing procedure of removing tag redundancy.

On the other hand, when it is judged in the step S206 that the tag processing is all completed, the process shifts to step S209, in which similarity is obtained between the tags having different titles. When the similarity is equal to or more than a predetermined threshold value, the tags are regarded as the same tag, and one of the tags is prevented from appearing on the document type definition to be generated. The processing procedure for obtaining this similarity to determine whether or not the tags have the same content is shown in the flowchart of FIG. 6.

First, the similarity of tags A, B having different titles is calculated in step S601. This calculating method comprises setting the similarity of the physical structure to 1 when the physical structures agree with each other. When the physical structures do not completely agree with each other, but partially agree with each other, the similarity of the physical structure is set to a value less than 1 which corresponds to the agreed proportion. The similar concept is applied to the semantic structure, and the similarity of the semantic structure is obtained. The dividing of the sum of the similarity of the physical structure and the similarity of the semantic structure by 2 results in a general similarity $d_{AB}$ of A and B.

In the next step S602, the similarity $d_{AB}$ obtained in the step S601 is compared with the predetermined threshold value δ. When the similarity $d_{AB}$ is less than δ, the process jumps to step S604 for trial of the next combination.

When the similarity $d_{AB}$ is equal to or more than the threshold value δ, the process shifts to step S603, in which the tag B is regarded as being of the same type as the tag A, the tag B is finally struck off a list for generating the document type definition, and redundancy is removed.

When the processing of the step S603 is completed, the process advances to step S604, in which it is judged whether or not the trial of combination of all tags is made. When the combination of all tags is not tried, the process returns to the step S601. When the combination of all tags is tried, the subroutine processing is ended to return to the main routine of FIG. 2.

Moreover, in the step S209, in addition to the above-described processing of FIG. 6, the physical structure and semantic structure of the document elements having the same title are compared. When the structures are different, the title of one of the tags is changed. For this purpose, the similarity is obtained between tags Aa and Ab having the same tag name in the same manner as described above. When similarity value $d_{AaAb}$ is less than the threshold value, the title of the tag Ab is changed. This threshold value may be different from the above-described value.

In step S210 of FIG. 2, the sentence word between the start tag and the end tag which have the same title is analyzed to obtain the information to be included in the tags. This analysis result is used to generate the document type definition in the next step S211.

Figure 7:
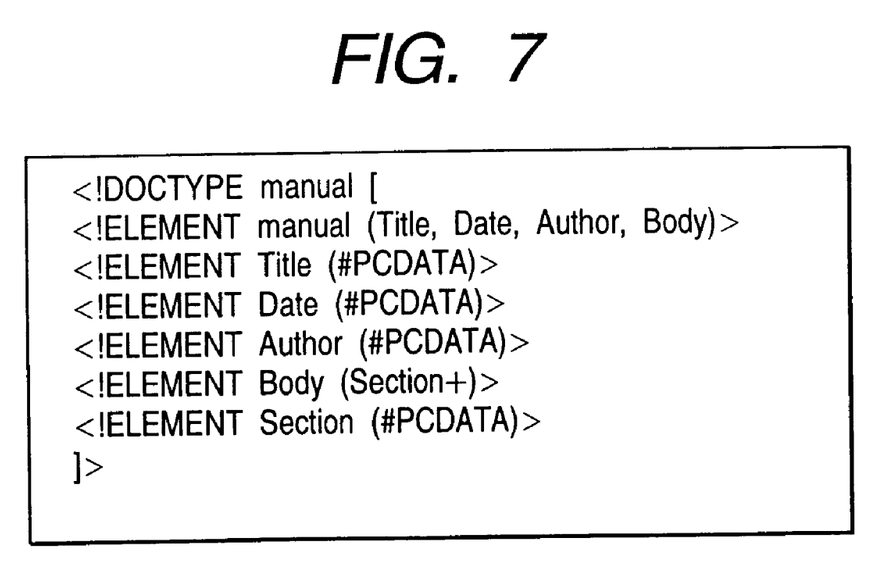
FIG. 7 is a diagram showing one example of document type definition.

FIG. 7 is a diagram showing one example of the generated document type definition, and the document type definition generated from the structured document data shown in FIG. 3A is shown as document type "manual".

Here, in FIG. 3A, the content of tag <Sect> agrees in physical structure with the content of tag <Section>, and the tags are the same in semantic structure in that they have the form of "numeral.". Therefore, it is determined in the step S209 that the tag <Sect> has the same content as that of the tag <Section>. As a result, the generated document type definition does not use <Sect>, and in <Body>, Section+, that is, tag <Section> repeatedly appears.

Second Embodiment

In the above-described first embodiment, the physical and semantic structures in the document are judged based on the sentence (portions other than tags), but the present invention is not limited to this.

For example, the physical information such as the relative positional relation between the tags and the inclusive relation of the tags is detected as the physical structure, or the meaning represented by the tag name or attribute is detected as the semantic structure, so that these structures may be used as the objects to obtain the similarity.

According to the embodiments described above, since the physical and semantic structures of the document element surrounded with the tags are judged, and the document type definition of the structured document provided with the tags is generated, the semantic information given to the tags can correctly be treated.

Furthermore, the redundancy to the tags having the same content can be removed, and the document type definition can be generated in which there are no tags being the same in title and different in meaning.

Additionally, the present invention may be applied to a computer system constituted of a plurality of apparatuses (e.g., host computer, interface apparatus, reader, printer, and the like), or to a device constituted of one apparatus (e.g., word processor, copying machine, facsimile device, and the like).

Moreover, it goes without saying that the objective of the present invention can be achieved by supplying a storage medium storing the program code of software to realize the function of the above-described embodiment to the system or the device, and reading and executing the program code stored in the storage medium by the computer (or CPU or MPU) of the system or the device.

In this case, the program code itself read from the storage medium realizes the function of the above-described embodiment, and the storage medium in which the program code is recorded constitutes the present invention.

As the storage medium in which the program code, and tables and other variable data are stored, for example, a floppy disk (FD), a hard disk, an optical disk, an optomagnetic disk, CD-ROM, CD-R, a magnetic tape, a nonvolatile memory card (IC memory card), ROM, and the like can be used.

Moreover, the function of the above-described embodiment is realized by executing the program code read by the computer, but it goes without saying that the present invention also includes a case in which an operating system (OS) operating on the computer performs a part or the whole of an actual processing based on the instruction of the program code and the function of the above-described embodiment is realized by the processing.

Although the present invention has been described in its preferred from with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A document type definition generating method for generating a document type definition of a structured document containing document elements of a plurality of document element types, wherein each one of the plurality of document element types has a document element name and each document element has a start tag and an end tag, said method comprising:

a physical structure judging step of judging a physical similarity between the document elements in the structured document, wherein the judging of the physical similarity is based on the physical position of the start tag of each document element in the structured document;

a semantic structure judging step of judging a semantic similarity between the document elements by comparing a character string form located between the start tag and the end tag of each of the document elements; and a document type definition generating step of judging a similarity of the document element tags based on the results obtained in said physical structure judging step and said semantic structure judging step, and generating the document type definition unifying the document element names of similar document elements, said document type definition generating step includes a redundancy removing step, wherein the physical structure and the semantic structure of a plurality of document elements, having tags different in element name, are judged as being of the same document element type in said physical structure judging step and said semantic structure judging step, excluding one document element name from a document type definition generating object based on the judgment results obtained in said physical structure judging step and said semantic structure judging step.

2. A document type definition generating method according to claim 1, wherein said physical structure judging step includes judging the physical similarity of the document elements based on an indentation or a blank line in the structured document.

3. A document type definition generating method according to claim 2, wherein, when the physical similarity of the document elements is judged based on the indentation in the structured document in said physical structure judging step, the judging is performed by excluding the indentation which represents a quotation.

4. A document type definition generating method according to claim 2, wherein, when the physical similarity of the document elements is judged based on the blank line in the structured document in said physical structure judging step, the judging is performed by excluding a determined number of blank lines from the structured document wherein the number of blank lines is determined by constantly skipping one or more blank lines.

5. A document type definition generating method according to claim 1, wherein said semantic structure judging step includes accessing a semantic information database to judge the semantic similarity of the document element based on a connection of words and phrases in the structured document and word types.

6. A document type definition generating method according to claim 1, wherein said semantic structure judging step includes judging the semantic similarity of the document element based on a meaning represented by document element tags surrounding the document element.

7. A document type definition generating method according to claim 1, wherein said redundancy removing step includes obtaining similarity degrees concerning agreement degrees of the physical structure and the semantic structure between document elements having tags different in document element name, and regarding the document elements as being of the same type when a general similarity value calculated from the similarity degrees in said redundancy removing step is equal to or greater than a predetermined threshold value.

8. A document type definition generating method according to claim 1, wherein said document type definition generating step includes a title changing step of, when the physical structure and the semantic structure of a plurality of document elements having document element tags with the same document element name are judged to be different in said physical structure judging step and said semantic structure judging step, regarding the document elements as being of different document element types and changing one document element name based on the judgment results obtained in said physical structure judging step and said semantic structure judging step.

9. A document type definition generating apparatus for generating a document type definition of a structured document containing document elements of a plurality of document element types, wherein each one of the plurality of document element types has a document element name and each document element has a start tag and an end tag, said apparatus comprising:
  physical structure judging means for judging a physical similarity between the document elements in the structured document, wherein the judging of the physical similarity is based on the physical position of the start tag of each document element in the structured document;
  semantic structure judging means for judging a semantic similarity between the document elements by comparing a character string form located between the start tag and the end tag of each of the document elements; and
  document type definition generating means for judging a similarity of the document element tags based on the results of said physical structure judging means and said semantic structure judging means, and generating the document type definition unifying the document element names of similar document elements,
  wherein said document type definition generating means includes redundancy removing means for, when the physical structure and the semantic structure of a plurality of document elements, having tags different in element name, are judged as being of the same document element type by said physical structure judging means and said semantic structure judging means, excluding one document element name from a document type definition generating object based on the judgment results of said physical structure judging means and said semantic structure judging means.

10. A document type definition generating apparatus according to claim 9, wherein said physical structure judging means judges the physical similarity of the document elements based on an indentation or a blank line in the structured document.

11. A document type definition generating apparatus according to claim 10, wherein said physical structure judging means judges the physical similarity of the document elements based on the indentation by excluding the indentation which represents a quotation.

12. A document type definition generating apparatus according to claim 10, wherein said physical structure judging means judges the physical similarity of the document elements based on the blank lines by excluding a determined number of blank lines from the structured document wherein the number of blank lines is determined by constantly skipping one or more blank lines.

13. A document type definition generating apparatus according to claim 9, wherein said semantic structure judging means accesses a semantic information database to judge the semantic similarity of the document element based on a connection of words and phrases in the structured document and word types.

14. A document type definition generating apparatus according to claim 9, wherein said semantic structure judging means judges the semantic similarity of the document element based on a meaning represented by document element tags surrounding the document element.

15. A document type definition generating apparatus according to claim 9, wherein said redundancy removing means obtains similarity degrees concerning agreement degrees of the physical structure and the semantic structure between document elements having tags different in element name, and regards the document elements as being of the same document element type when a general similarity value calculated from the similarity degrees by said redundancy removing means is equal to or greater than a predetermined threshold value.

16. A document type definition generating apparatus according to claim 9, wherein said document type definition generating means includes title changing means for, when the physical structure and the semantic structure of a plurality of document elements having document element tags with the same element name are judged to be different by said physical structure judging means and said semantic structure judging means, regarding the document elements as being of different document element types and changing one document element name based on the judgment results of said physical structure judging means and said semantic structure judging means.

17. A computer-readable storage medium storing a program for controlling a computer to execute a document type definition generation method for generating document type definition of a structured document containing document elements of a plurality of document element types, wherein each one of the plurality of document element types has a document element name and each document element has a start tag and an end tag, said program comprising:
  code for a physical structure judging step of judging a physical similarity between the document elements in the structured document, wherein the judging of the physical similarity is based on the physical position of the start tag of each document element in the structured document;
  code for a semantic structure judging step of judging a semantic similarity between the document elements by comparing a character string form located between the start tag and the end tag of each of the document elements; and code for a document type definition generating step of judging a similarity of the document element tags based on the results obtained by said physical structure judging code and said semantic structure judging code, and generating the document type definition unifying the document element names of similar document elements, wherein said code for a document type definition generating step includes code for a redundancy removing step of, when the physical structure and the semantic structure of a plurality of document elements, having tags different in element name, are judged as being of the same document element type by said code for a physical structure judging step and said code for a semantic structure judging step, excluding one document element name from a document type definition generating object based on the judgment results obtained by said code for a physical structure judging step and said code for a semantic structure judging step.

* * * * *